United States Patent [19]

Rouzaud

[11] Patent Number: 5,257,840
[45] Date of Patent: Nov. 2, 1993

[54] SAFETY LOCKING DEVICE HAVING A ROCKING HOOK

[75] Inventor: Dominique Rouzaud, Angervilliers, France

[73] Assignee: Messier-Bugatti, Velizy-Villacoublay, France

[21] Appl. No.: 949,134

[22] Filed: Sep. 23, 1992

[30] Foreign Application Priority Data

Sep. 25, 1991 [FR] France .................. 91 11812
Nov. 13, 1991 [FR] France .................. 91 13921

[51] Int. Cl.$^5$ ................................ E05C 3/16
[52] U.S. Cl. ........................ 292/201; 292/DIG. 65
[58] Field of Search ............ 292/201, 216, 48, 18, 292/27, DIG. 14, DIG. 62, DIG. 65

[56] References Cited

U.S. PATENT DOCUMENTS

| | | | |
|---|---|---|---|
| 1,691,724 | 11/1928 | Kruschka | 292/18 |
| 2,859,995 | 11/1958 | Rigaud | 292/53 |
| 3,325,203 | 6/1967 | Moler | 292/201 |
| 3,347,584 | 10/1967 | Johnstone | 292/216 X |
| 3,386,761 | 6/1968 | Johnstone et al. | 292/201 |
| 3,565,476 | 2/1971 | Berman | 292/201 |
| 4,389,930 | 6/1983 | Rutschilling | 292/201 X |
| 4,554,907 | 11/1985 | Overley et al. | 292/27 X |
| 4,703,961 | 11/1987 | Weinerman et al. | 292/48 X |

FOREIGN PATENT DOCUMENTS

1039871 7/1951 France .

*Primary Examiner*—Richard E. Moore
*Attorney, Agent, or Firm*—Sixbey, Friedman, Leedom & Ferguson

[57] ABSTRACT

The locking device comprises a first hook cantilevered out from a rocking pin to support a catch member and bearing against a retractable locking member that opposes rocking movement of the first hook, and a second hook adjacent to the first hook and associated therewith by a link member so that when the first hook is closed, the second hook is kept in a position close to a position in which the second hook supports the catch member.

9 Claims, 2 Drawing Sheets

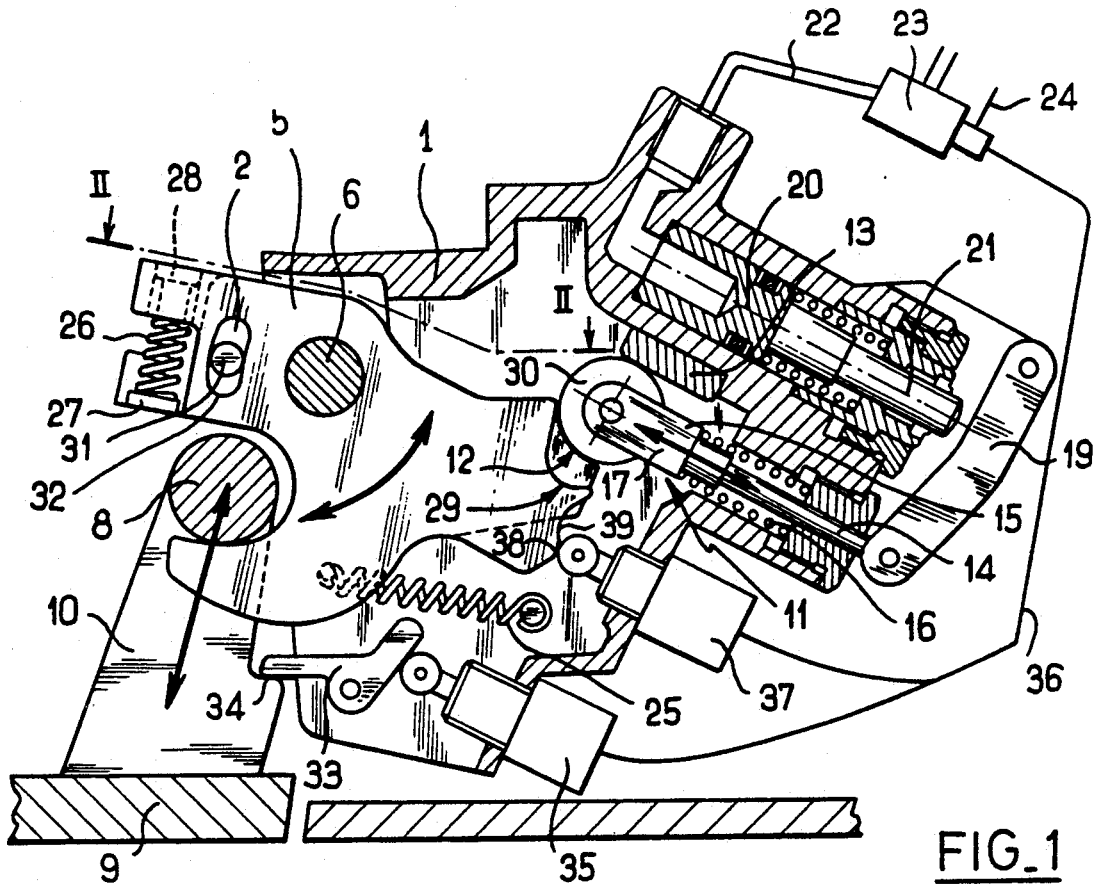
FIG_1
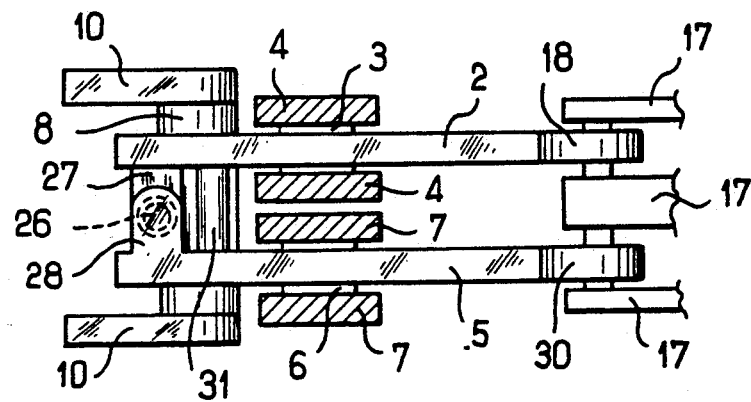
FIG_2
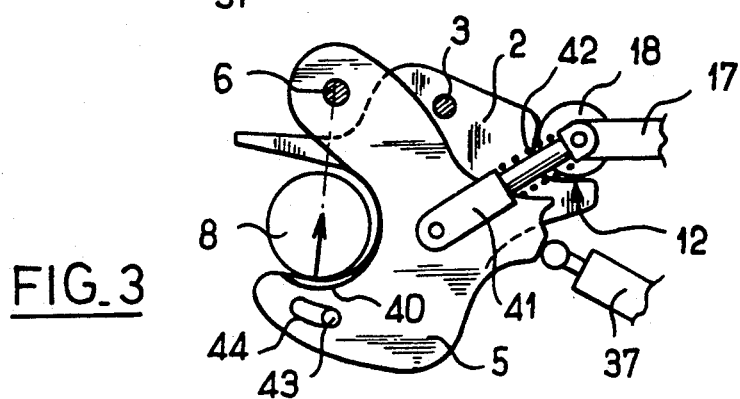
FIG_3

SAFETY LOCKING DEVICE HAVING A ROCKING HOOK

The invention relates to a safety locking device having a rocking hook.

BACKGROUND OF THE INVENTION

Locking devices are known that comprise a housing, a hook that is cantilevered out from a rocking axis carried by the housing, and a retractable locking member for opposing rocking movement of the hook when the hook is loaded. This type of locking device is used, in particular, for locking a door or a flap in its closed position. In some cases, in particular when the device is used for locking the thrust-reversing flaps of aircraft jet engines, it is necessary for the locking to be provided particularly reliably since failure of the locking device could have extremely severe consequences. In particular, with thrust-reversing flaps for aircraft engines, untimely opening of the flaps in flight or during landing prior to the wheels running on the ground, gives rise to a breaking force on the aircraft such that control of the aircraft is lost irremediably.

SUMMARY OF THE INVENTION

The present invention provides a locking device including a housing, a first hook cantilevered out on a rocking pin carried by the housing to enable the hook to rock between an open position and a closed position in which the first hook supports a catch member, and a retractable locking member disposed to oppose rocking movement of the first hook by a locking portion of the first hook bearing against the locking member, the device further including a second hook adjacent to the first hook, and a link member between the first hook and the second hook so that in the closed position of the first hook, the second hook is maintained in a position close to a position in which the second hook supports the catch member.

Thus, in the event of the first hook failing, the second hook comes immediately into operation taking over from the first hook and supporting the catch member.

Preferably, the locking device includes a position detector for the catch member and a position detector for the second hook connected to a control member for the locking member. Thus, on detecting movement of the catch member as results from a failure of the first hook or from a failure of the second hook, the locking member opening command is immediately inhibited.

In an embodiment of the invention, the link member is a resilient member disposed between the first hook and the second hook to urge the second hook into making contact with the catch member, and the second hook includes a locking portion which is set back from the locking portion of the first hook relative to the locking member so long as the first hook is supporting the catch member.

In an advantageous version of this embodiment, the locking portion of the second hook is of a shape that ensures that the locking member is mechanically held in position when it is in contact therewith.

In a variant of this embodiment of the invention, the link member is a common support block having the first hook and the second hook secured thereto, the second hook including a hook edge which is set back relative to a hook edge of the first hook, and a locking portion that is set back relative to a locking portion of the first hook away from the locking member. Preferably, the first hook and the second hook are integrally formed with the common support block.

In another embodiment of the invention, the second hook is mounted on a rocking pin that lies on a reaction direction of the second hook when the second hook is supporting the catch member, the second hook is resiliently urged towards a position where it comes into contact with the catch member while the first hook is in its closed position, and the link member between the first and second hooks includes an abutment carried by the first hook to keep the second hook slightly away from the catch member while the first hook is in service. Thus, in the event of the first hook failing by breaking or by the rocking pin which supports it breaking, the catch member immediately presses against the second hook which supports it in stable manner.

BRIEF DESCRIPTION OF THE DRAWINGS

Embodiments of the invention are described by way of example with reference to the accompanying drawings, in which:

FIG. 1 is an elevation view, partially in section, of a first embodiment of a locking device of the invention;

FIG. 2 is a section view on line II—II of FIG. 1;

FIG. 3 is a diagram showing a second embodiment of the invention;

DETAILED DESCRIPTION

Figure 4:
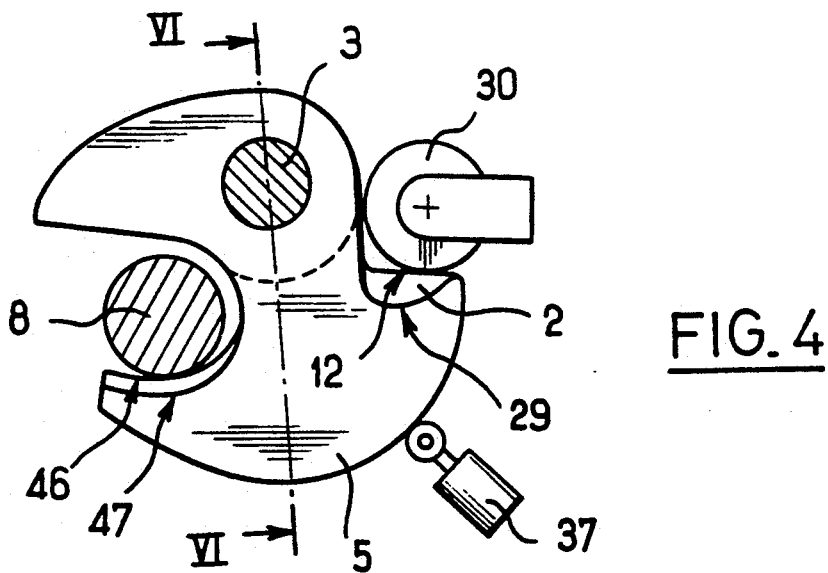
FIG. 4 is a side view of the locking hooks in a variant of the FIG. 1 device.

With reference to FIGS. 1 and 2, the first embodiment of the locking device of the invention comprises a housing 1, a first hook 2 mounted to rock about a rocking pin 3 carried by spacers 4 secured to the housing, and a second hook 5 mounted adjacent to the first hook 2 to rock on a rocking pin 6 carried by spacers 7 also secured to the housing.

In this first embodiment, the first hook 2 and the second hook 5 are almost identical in shape and their outlines are therefore largely superposed in FIG. 1, particularly since their rocking pins are in axial alignment.

The first hook 2 and the second hook 5 are cantilevered out from their respective rocking pins, that is to say, when a catch member 8 bears against the hooks in a closed position, the catch member 8 tends to tilt them towards an open position in which it can escape from the hooks. The catch member 8 may be, for example, a catch rod fixed to a thrust-reversing flap 9 by gusset plates 10. To keep the first hook 2 in the closed position as shown in FIG. 1, the locking device includes a locking member given overall reference 11 and inserted between a locking portion 12 of the hook 2 and an abutment 13 carried by the housing.

In the particular embodiment shown, the locking member 11 comprises a control rod 14 mounted to slide in a bore of the housing 1 and including a shoulder 15 on which a spring 16 bears urging the locking member towards an insertion position between the locking portion 12 of the hook 2 and the abutment 13. The end of the locking member 11 facing the hook 2 includes a fork 17 carrying a locking wheel 18. The control rod 14 is connected to a lever 19 which is hinged to the housing 1, and the housing 1 supports a hydraulic actuator 20 whose rod 21 extends facing the lever 19. The control actuator 20 is connected by a duct 22 to an electrically controlled control valve 23 connected to an electronic control center (not shown) by an electrical line 24. The first hook 2 is normally urged towards its open position by a spring 25 having one end fixed to the hook 2 and another end fixed to the housing 1.

The first hook 2 and the second hook 5 are associated by a link member comprising a helical spring 26 bearing against a tongue 25 secured to the first hook 2 and a tongue 28 secured to the second hook 5 so as to cause the hook 2 and the hook 5 to pivot in opposite directions such that, in the closed position, a locking portion 29 of the second hook 5 is normally set back from the locking portion 12 of the first hook 2 relative to the locking member 11, which member further includes a wheel 30 carried by a fork 17 facing the locking portion 29 of the second hook 5. Unlike the locking portion 12 of the first hook 2 which is preferably rectilinear to enable the wheel 18 of the locking member 11 to be disengaged, the locking portion 29 has a concave curvilinear shape matching that of the wheel 30 so as to cause the locking member 11 to be mechanically held in place when the locking portion 29 is in contact therewith. The movement of the hook 5 away from the hook 2 that results from the action of the spring 26 is limited by co-operation between a finger 31 carried by the first hook 2 and a slot 32 formed in the second hook 5.

A lever 33 is pivotally mounted on the housing 1 and has one of its ends in contact with a shoulder 34 on one of the gusset plates 10 supporting the catch member 8, and has an opposite end in contact with a position detector 35 connected to the controlling valve 23 by a line 36. A position detector 37 for detecting the position of the second hook 5 is also fixed to the housing 1 and extends facing an edge of the hook 5 which includes a convex profile 38 adjacent to a concave profile 39.

This embodiment of the invention operates as follows. In normal operation, with the thrust-inversion flap 9 being in its closed position, the device is in the state shown in FIG. 1, i.e. the locking portion 12 of the first hook 2 bears against the wheel 18 of the locking member 11 and the hook 2 therefore supports the catch member 8 in order to keep the flap 9 in its closed position. The second hook 5 is pushed back by the spring 26 in an anticlockwise direction in the figure. This movement is limited by the hook 5 coming into contact with the catch member 8, and in this position the locking portion 29 of the hook 5 is slightly offset from the locking wheel 30 of the locking member 11. The abutment finger 31 is disposed substantially in the middle of the slot 32. The second hook 5 is therefore in contact with the catch member 8 but it is not supporting it. The lever 33 for detecting the position of the catch member 8 bears against the rod of the detector 35 to indicate that the flap 9 is properly closed. The convex portion 38 of the edge of the second hook 5 faces the position detector 37 which therefore provides a signal representative of the second hook 5 being in its proper position. The control valve 23 is therefore not inhibited and the locking member 11 may be retracted under control of the line 24 to cause the locking device to open.

If the first hook 2 or its rocking pin 3 should break due to the load or the vibrations to which it is subjected, then the flap 9 tends to open taking the catch member 8 with it. In such movement, the second hook 5 pivots anticlockwise in the figure until its locking portion 29 comes into contact with the wheel 30 of the locking member 11 which is then mechanically held in position by the concave shape of the locking portion 29. In addition, the displacement of the catch member 8 causes the lever 33 to pivot and the detector 35 then applies a signal to the control valve 23 inhibiting the opening actuator 20.

Should the second hook 5 or its rocking pin 6 break while the first hook 2 is in the closed position, then the second hook 5 no longer bears against the catch member 8 and the remaining portion of the hook 5 tends to rock clockwise in the figure under drive from the spring 26. The concave portion 39 of the edge of the hook 5 then moves to face the position detector 37 which applies a second hook failure signal to inhibit the control valve 23.

In the second embodiment shown in part and diagrammatically in FIG. 3, elements having functions analogous to those of FIG. 1 are given the same numerical references.

In this embodiment, the first hook 2 is still cantilevered, i.e. its rocking axis 3 is offset relative to the reaction direction of the hook (as represented by an arrow) when it is supporting the catch member 8. As before the hook 2 includes a locking portion 12 bearing against the locking wheel 18 of the locking member 11.

In this case, the second hook 5 is a self-locking hook, i.e. its rocking axis 6 is disposed on the reaction direction of the hook when the hook is supporting the catch member. The second hook also includes a concave support surface 40 for receiving the catch member 8. In addition, the second hook 5 is connected to the locking member 11 by a telescopic link 41 having one end fixed to the hook 5 and its opposite end fixed to the locking member 11, and being urged towards its extended position by a spring 42. The offset between the first hook 2 and the second hook 5 is limited by an abutment 43 carried by the first hook 2 and engaging in a curvilinear slot 44 formed through the second hook 5. The relative position of the abutment 43 and of the slot 44 is designed so that in the closed position shown in FIG. 3 and when the abutment 43 is at the end of the slot 44, the concave support surface 40 of the second hook 5 is slightly set back from the catch member 8.

This second embodiment of the invention operates as follows. In the normal utilization position shown in FIG. 3, the catch member 8 is supported by the first hook 2. If the first hook or its rocking pin should break, then the catch member 8 bears against the second hook 5 which supports it and simultaneously mechanically prevents the locking member 11 from moving. If the second hook 5 should break, the spring 42 tends to pivot the remaining portion of the hook 5 which is no longer retained by the positioning finger 43, and as a result the detector 37 applies an inhibit signal to the control valve 23.

Providing both hooks are operating properly, the control actuator 20 can retract the locking member 11 which in turn causes the second hook 5 to retract. After the locking member 11 and the hook 5 associated therewith have been fully retracted, the first hook 2 rocks in conventional manner towards its open position under the effect of forces from the catch member 8 and the return spring 25.

On closing, the hook 2 is moved to its closed position before the locking member engages, and the hook 5 is thus held off so long as the hook 2 has not closed.

Figure 5:
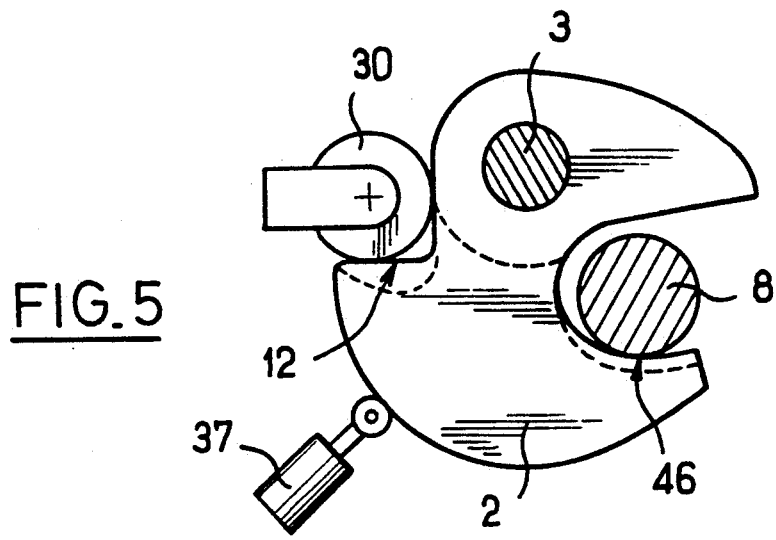
FIG. 5 is a side view seen looking in the opposite direction to FIG. 4.
Figure 6:
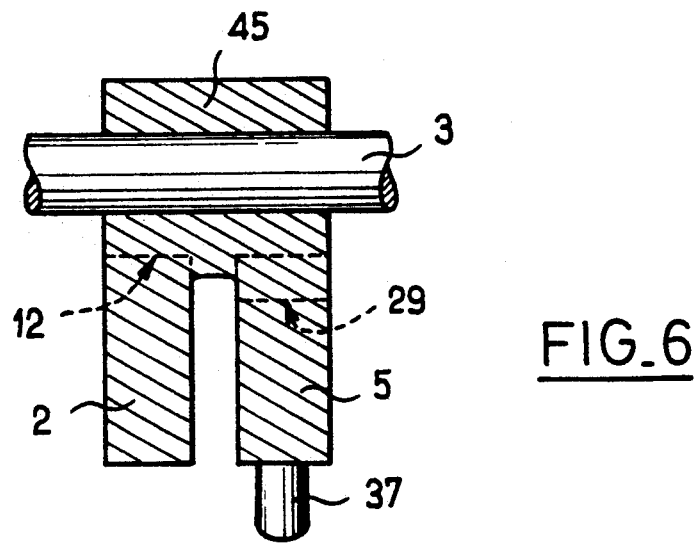
FIG. 6 is a section view on line VI—VI of FIG. 4.

FIGS. 4 to 6 show a variant of the FIG. 1 device. To simplify the explanation, only the locking hooks are shown together with the breakage detector for the second hook.

In this variant embodiment, the first hook 2 and the second hook 5 are carried by a common support block 45 and they are preferably integrally formed therewith, e.g. by machining a block of metal. The common support block 45 is mounted to rock about a rocking pin 3. As before, the first hook 2 includes a locking portion 12 that bears against the locking wheel 30 when the hook is loaded, i.e. when a catch member 8 is bearing against a hooking edge 46 of the hook 2. In this position, as shown in the figures, the catch member 8 is secured and therefore retains the object with which it is associated.

In order to ensure that the second hook 5 is not loaded simultaneously with the first hook, the second hook has a hooking edge 47 which is set back from the hooking edge 46 of the first hook. The second hook also includes a portion 29 bearing against the locking wheel 30 which is likewise set back relative to the corresponding portion 12 of the first hook. In addition, the detector 37 for detecting breakage of the second hook bears against it at an appropriate point of the edge of the second hook. If the second hook breaks when not loaded, then it will break in its narrowest portion, i.e. where it joins the common support block 45. The broken-off hook portion will fall away and the detector 37 will indicate this situation regardless of its position along the edge of the hook.

Should the first hook break, the catch member 8 will bear against the edge 47 of the second hook, thereby causing it to pivot until its portion 29 come into contact with the wheel 30. The device will then be held in its locked position as in the case of FIG. 1.

It will be observed that the offset between the edges 46 and 47 and the offset between the portions 12 and 29 need only be very small to keep the second hook unloaded so long as the first hook is functioning. However, it is preferable to ensure that the offset is large enough to enable the position detector 35 to be urged over a stroke that is long enough for a change of situation to be detected without requiring a highly sensitive detector to be used.

Naturally, the invention is not limited to the embodiments described and variants may be applied thereto without going beyond the ambit of the invention. In particular, although the device of the invention is shown with a locking member that is slidably mounted, the invention could be implemented by providing a locking member that is pivotally mounted.

Further, if it is not desired to prevent the locking device from opening in the event of one of the hooks breaking, then the profile of the second hook may be designed so that it does not mechanically hold the locking member 11 in place and the position detectors 35 and 37 may be omitted or they may merely be connected to an indicator for providing a warning without actually inhibiting the control valve 23.

When a link member is used that comprises a common support block, it is also possible for the two hooks to be secured to the common support 45 instead of being integrally formed therewith.

I claim:

1. A locking device comprising a housing, a first hook cantilevered out on a rocking pin carried by the housing to enable the first hook to rock between an open position and a closed position in which the first hook supports a catch member by a first hooking edge of said first hook, and a retractable locking member disposed to oppose rocking movement of the first hook by a first locking portion of said first hook bearing against said locking member, a second hook adjacent to the first hook, said second hook having a second hooking edge of similar shape to the first hooking edge of said first hook in order to support the catch member, and a link member between the first hook and the second hook, wherein the second hook is maintained in a position close to a position in which the second hook supports the catch member by said second hooking edge when said first hook is in the closed position, so that in the event of a failing of the first hook, the second hook comes into operation for supporting the catch member.

2. A locking device according to claim 1, wherein the link member is a resilient member disposed between the first hook and the second hook to urge the second hook into making contact of said second hooking edge with the catch member, and wherein the second hook includes a second locking portion which is set back from the first locking portion of the first hook relative to the locking member so long as the first hook is supporting the catch member by the first hooking edge.

3. A locking device according to claim 2, wherein the second locking portion of the second hook is of a shape that ensures that the locking member is mechanically held in position when it is in contact therewith.

4. A locking device according to claim 2, wherein the second hook is mounted on a rocking pin which is independent from that of the first hook.

5. A locking device according to claim 1, wherein the second hook is mounted on a rocking pin that lies on a reaction direction of the second hook when the second hook is supporting the catch member by the second hooking edge, wherein the second hook is resiliently urged towards a position where said second hooking edge comes into contact with the catch member while the first hook is in its closed position, and wherein the link member between the first and second hooks includes an abutment carried by the first hook to keep the second hook slightly away from the catch member while the first hook is supporting the catch member by the first hooking edge.

6. A locking device according to claim 5, wherein the second hooking edge of the second hook includes a concave support surface for receiving the catch member.

7. A locking device according to claim 1, including a control member for controlling the locking member, and a position detector for the second hook operatively connected to the control member such that, should the second hook or its rocking pin break while the first hook is in the closed position, the detector applies a second hook failure signal to inhibit said control member.

8. A locking device according to claim 1, wherein the link member is a support block having the first hook and the second hook rigidly secured thereto, and wherein the second hooking edge of the second hook is set back relative to the first hooking edge of the first book, and the second locking portion of said second hook is set back relative to the first locking portion of the first hook away from the locking member, in order to ensure the second hook is not loaded simultaneously with the first hook.

9. A locking device according to claim 8, wherein the first hook and the second hook are integrally formed with the support block.

* * * * *